(12) United States Patent
Creech et al.

(10) Patent No.: US 6,659,050 B1
(45) Date of Patent: Dec. 9, 2003

(54) VALVE ASSEMBLY FOR CONTROLLING COOLANT FLOW EXITING AN ENGINE

(75) Inventors: Michael Creech, Grosse Pointe, MI (US); Reed K. Hauck, Saline, MI (US); Phillip James Weis, Ann Arbor, MI (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 10/092,334

(22) Filed: Mar. 6, 2002

(51) Int. Cl.$^7$ .................................................. F01P 7/14
(52) U.S. Cl. .................................................. 123/41.08
(58) Field of Search ........................ 123/41.08, 41.12; 251/229, 305, 129.01; 137/457, 446, 468, 861, 875

(56) References Cited

U.S. PATENT DOCUMENTS

| | | |
|---|---|---|
| 1,672,430 A | 6/1928 | Schnyder |
| 3,064,938 A | 11/1962 | Knox .......................... 251/171 |
| 3,768,729 A | 10/1973 | Dean, Jr. ..................... 236/13 |
| 4,007,910 A | 2/1977 | Yasuoka et al. ............. 251/229 |
| 4,008,877 A | 2/1977 | Yasuoka et al. ........... 251/249.5 |
| 4,169,871 A | 10/1979 | Eason ....................... 261/23 A |
| 4,200,258 A * | 4/1980 | Gliatas ........................ 251/214 |
| 4,384,559 A | 5/1983 | Tchang et al. .............. 123/332 |
| 4,747,942 A | 5/1988 | Strauss ....................... 209/455 |
| 4,817,374 A | 4/1989 | Kitta .......................... 60/313 |
| 4,848,398 A | 7/1989 | Leach ....................... 137/556.3 |
| 4,870,990 A | 10/1989 | Bierling et al. ............. 137/595 |
| 5,085,269 A | 2/1992 | Aoki ........................... 165/43 |
| 5,111,775 A | 5/1992 | Sumida et al. ............. 123/41.1 |
| 5,255,891 A | 10/1993 | Pearson et al. ........ 251/129.11 |
| 5,291,941 A | 3/1994 | Enomoto et al. ............. 165/62 |
| 5,427,141 A | 6/1995 | Ohtsubo ..................... 137/595 |
| 5,531,264 A | 7/1996 | Eike et al. .................... 165/43 |
| 5,535,718 A | 7/1996 | Nakai et al. ................ 123/336 |
| 5,582,236 A | 12/1996 | Eike et al. .................... 165/43 |
| 5,671,635 A | 9/1997 | Nadeau et al. ................ 73/168 |
| 5,934,642 A | 8/1999 | Pearson et al. ............... 251/61 |
| 5,971,290 A | 10/1999 | Echigoya et al. ...... 237/12.3 B |
| 5,979,373 A | 11/1999 | Sano ......................... 123/41.1 |
| 6,186,471 B1 | 2/2001 | Genga et al. .......... 251/129.12 |
| 6,223,772 B1 | 5/2001 | Cummings et al. ......... 137/595 |
| 6,263,917 B1 | 7/2001 | Evans ........................ 137/595 |

* cited by examiner

Primary Examiner—Tony M. Argenbright
Assistant Examiner—Katrina B. Harris
(74) Attorney, Agent, or Firm—Dykema Gossett PLLC

(57) ABSTRACT

A valve assembly for controlling the amount of coolant exiting an engine is provided. The valve assembly includes a valve housing that is mounted to the engine and defines a passage that is in fluid communication with a coolant outlet in the engine. A motor in the valve housing drives a valve shaft that extends into the passage and on which a butterfly valve plate is mounted. The physical geometry of the inventive assembly is not significantly effected by changes in coolant temperature or coolant contamination and the integrates the valve member and actuator in a single assembly to improve packaging and material use and eliminates potential coolant leak points.

20 Claims, 3 Drawing Sheets

VALVE ASSEMBLY FOR CONTROLLING COOLANT FLOW EXITING AN ENGINE

BACKGROUND OF THE INVENTION

1. Field of the Invention

This invention relates to fluid handlin; systems in vehicles and, in particular, to a valve assembly for controlling tile flow of coolant exiting a vehicle engine.

2. Discussion of Related Art

In a conventional vehicle fluid handling system, engine coolant travels between a vehicle engine, a radiator, and a hearer core. In particular, coolant is provided So the engine and heat is transferred from the engine to the coolant. Upon exiting the engine, the coolant flows to one or both of the radiator and the heater core. Heat is then vented into the air by the radiator or into the passenger compartment of the vehicle by the heater core, respectively. Finally, the coolant returns from the radiator and/or heater core to a pump that provides the coolant to the engine again.

The flow of coolant from the engine to the radiator is typically regulated using a thermostat. The thermostat controls the amount of coolant flowing from the engine to the radiator responsive to the temperature of the engine as indicated by the engine coolant. When the engine temperature is relatively low, the thermostat limits or prevents the flow of coolant from the engine to the radiator so that the engine warms up more quickly. In this circumstance, coolant is frequently directed through a bypass directly to the pump and/or engine. When the coolant temperature reaches a predetermined temperature, the thermostat allows coolant to flow to the radiator.

The use of a thermostat in conventional fluid handling systems is disadvantageous. In particular, the physical geometry of conventional thermostats is affected by the temperature of the engine coolant. As a result, conventional thermostats often allow coolant to pass (or leak) from the engine to the radiator before a predetermined temperature is reached at which the thermostat is designed to open the passageway between the engine and radiator. This reduces engine efficiency under certain operating conditions because the engine cannot reach a desired operating temperature as quickly as desired. As a result, fuel economy is reduced and emissions increased relative to desired values.

The inventors herein have recognized a need for a valve assembly for controlling an amount of coolant exiting an engine that will minimize and/or eliminate one or more of the above-identified deficiencies.

SUMMARY OF THE INVENTION

The present invention provides a valve assembly for controlling an amount of coolant exiting an engine.

A valve assembly in accordance with the present invention includes a valve housing mounted to the engine and having a passage extending therethrough. The valve housing may be mounted to a variety of engine components including the engine block, the cylinder head, a crossover casting, or the intake manifold. The passage of the valve housing is in fluid communication with a coolant outlet in the engine. The assembly also includes a motor disposed within the valve housing. The motor includes a motor shaft extending therefrom. The assembly also includes a valve shaft configured to rotate responsive to rotation of the motor shaft. The valve shaft maybe driven through one or more gears disposed between the motor and valve shafts. Finally, the assembly includes a plate rotatably supported on the valve shaft within the passage defined in the valve housing. The rotational position of the plate controls the amount of coolant exiting the engine.

A valve assembly in accordance with the present invention has several advantages as compared to conventional devices for controlling coolant exiting an engine. First, engine coolant temperature has less of an effect on the inventive valve assembly than on conventional thermostats. As a result, the inventive valve assembly allows little if any coolant to pass prior to the temperature at which the valve assembly is designed to open. Engine efficiency is therefore increased resulting in greater fuel economy and reduced engine emissions. Second, the inventive assembly tolerates contamination from the engine coolant better than conventional devices and therefore has a greater lifespan and requires less maintenance than conventional devices. Third, the inventive assembly integrates the valving member and the components that drive the valving member in a single assembly that is directly coupled to the engine. In this manner, the inventive assembly improves packaging, requires less material, reduces potential coolant leak points and improves bearing alignment for the valve shaft.

These and other advantages of this invention will become apparent to one skilled in the art from the following detailed description and the accompanying drawings illustrating features of this invention by way of example.

DETAILED DESCRIPTION OF ONE OR MORE EMBODIMENTS OF THE INVENTION

Figure 1:
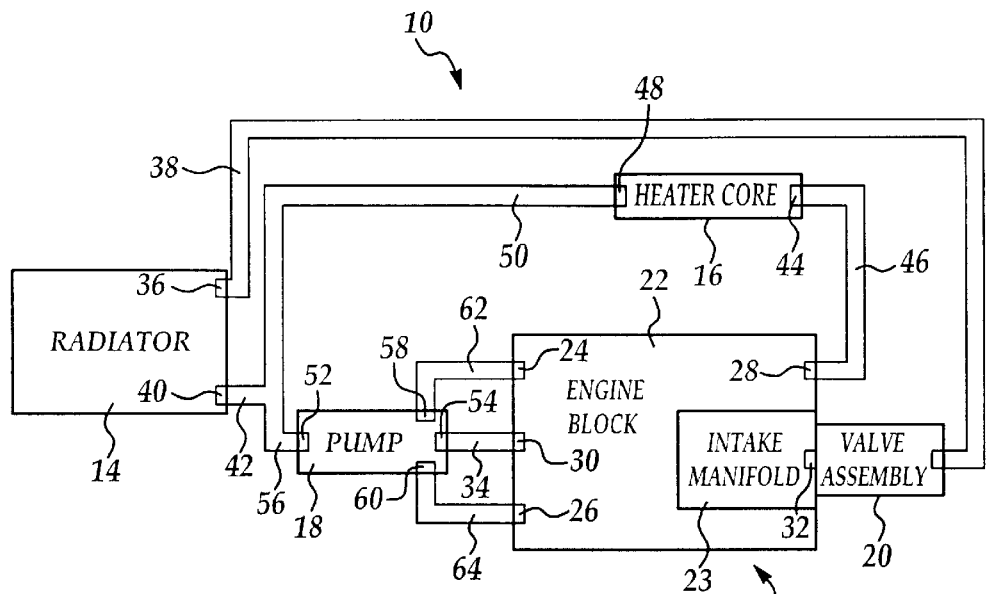
FIG. 1 is a block diagram illustrating a fluid handling system for a vehicle engine incorporating a valve assembly in accordance with the present invention.

Referring now to the drawings wherein like reference numerals are used to identify identical components in the various views, FIG. 1 illustrates a fluid handling system 10 for a vehicle having an engine 12, a radiator 14, a heater core 16, a pump 18, and a valve assembly 20 in accordance with the present invention. Although the inventive valve assembly 20 will be described with respect to a vehicle fluid handling system 10, it should be understood that the inventive valve assembly may find use in a wide variety of applications in which engines are used to provide power and are cooled by fluids flowing through the engine.

Engine 12 provides motive power to the vehicle and may comprise any of a wide variety of conventional engines. Engine 12 may include an engine block 22, a cylinder head (not shown), a crossover casting, and intake manifold 23 that together define a plurality of cylinders (not shown) and fluid passages (not shown) configured to allow an engine coolant to circulate within engine 12. As will be understood by those in the art, the composition of the engine coolant may vary, but typically will include water. Engine 12 also defines one or more inlets 24, 26 configured to receive coolant from pump 18 and one or more outlets 28, 30, 32 configured to allow coolant to exit engine 12. In the illustrated embodiment, engine 12 includes three outlets 28, 30, 32 that deliver coolant to heater core 16, pump 18—through a bypass 34—and valve assembly 20.

Radiator 14 is provided to vent heat from the engine coolant to the air. Radiator 14 is conventional in the art an includes an inlet 36 that receives coolant from engine 12 through a fluid conduit 38 and an outlet 40 that provides coolant to a fluid conduit 42 leading to pump 18.

Heater core 16 is provided to deliver heat to the passenger compartment of the vehicle and is also conventional in the art. Core 16 includes an inlet 44 that receives coolant from engine through a fluid conduit 46 and an outlet 48 that delivers coolant to pump 18 through another fluid conduit 50.

Pump 18 is provided force the engine coolant through system 10 and is also conventional in the art. Pump 18 includes one or more inlets 52, 54 configured to receive coolant from radiator 14 and heater core 16 through fluid conduit 56 and from engine 12 through bypass 34. Pump 18 includes one or more outlets 58, 60 configured to deliver coolant to fluid conduits 62, 64 leading to inlets 24, 26 of engine 12.

Figure 2:
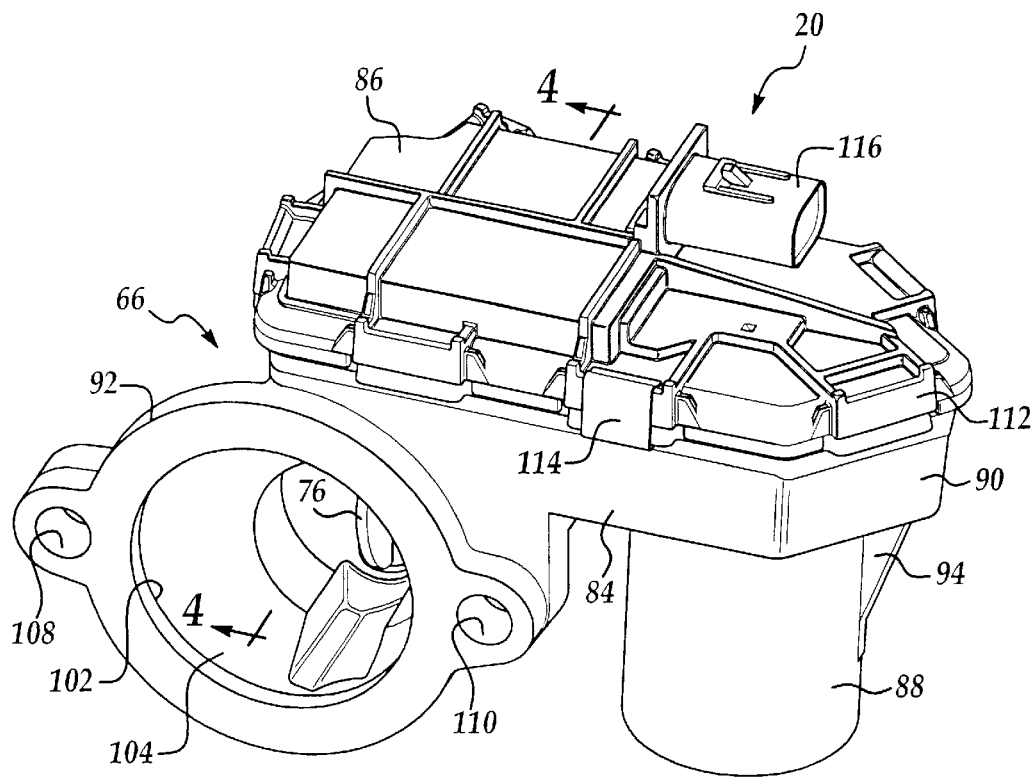
FIG. 2 is a perspective view of a valve assembly in accordance with the present invention.
Figure 3:
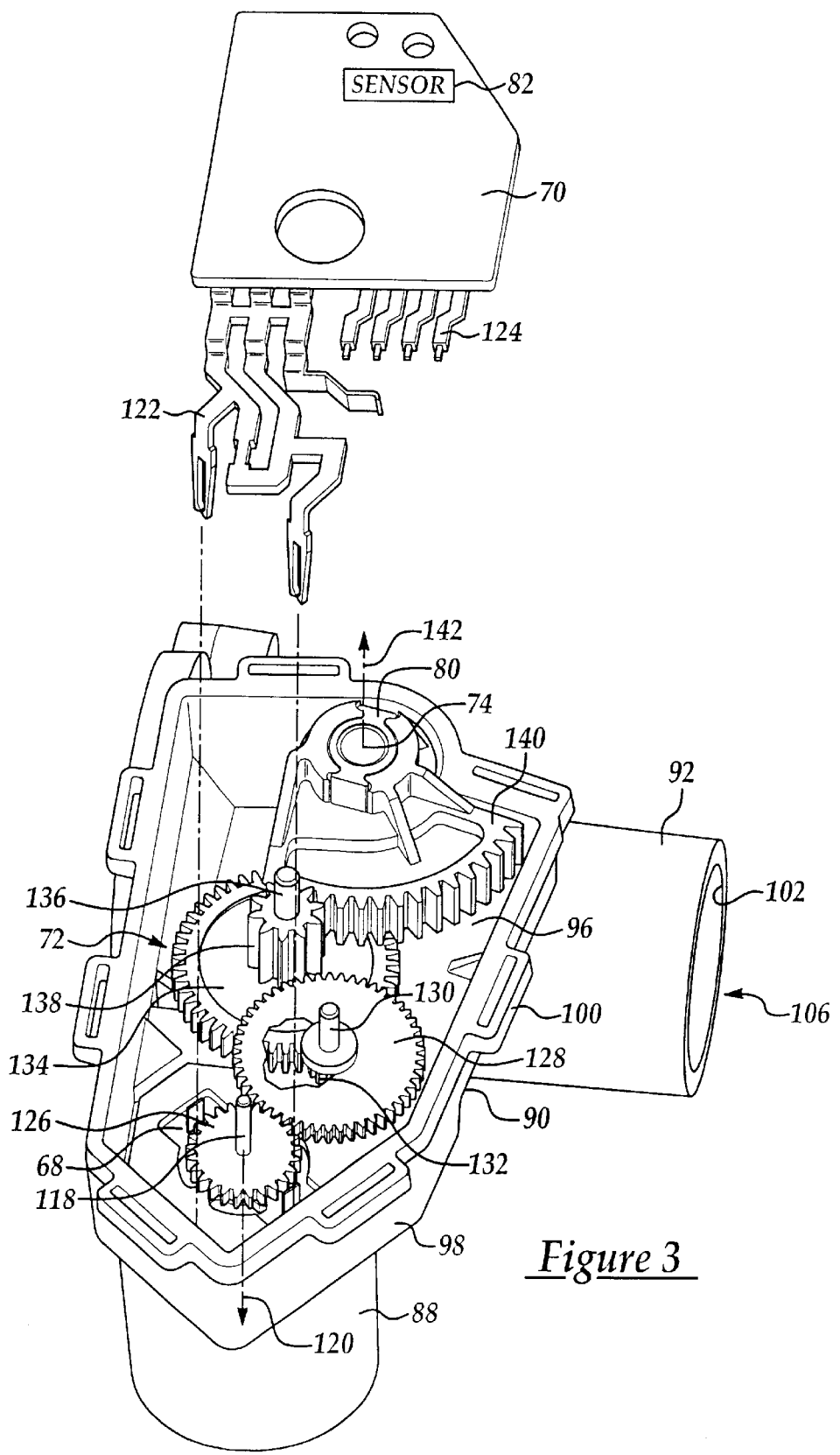
FIG. 3 is a partially exploded, perspective view of the valve assembly of FIG. 2 with a portion of the housing of the valve assembly removed.
Figure 4:
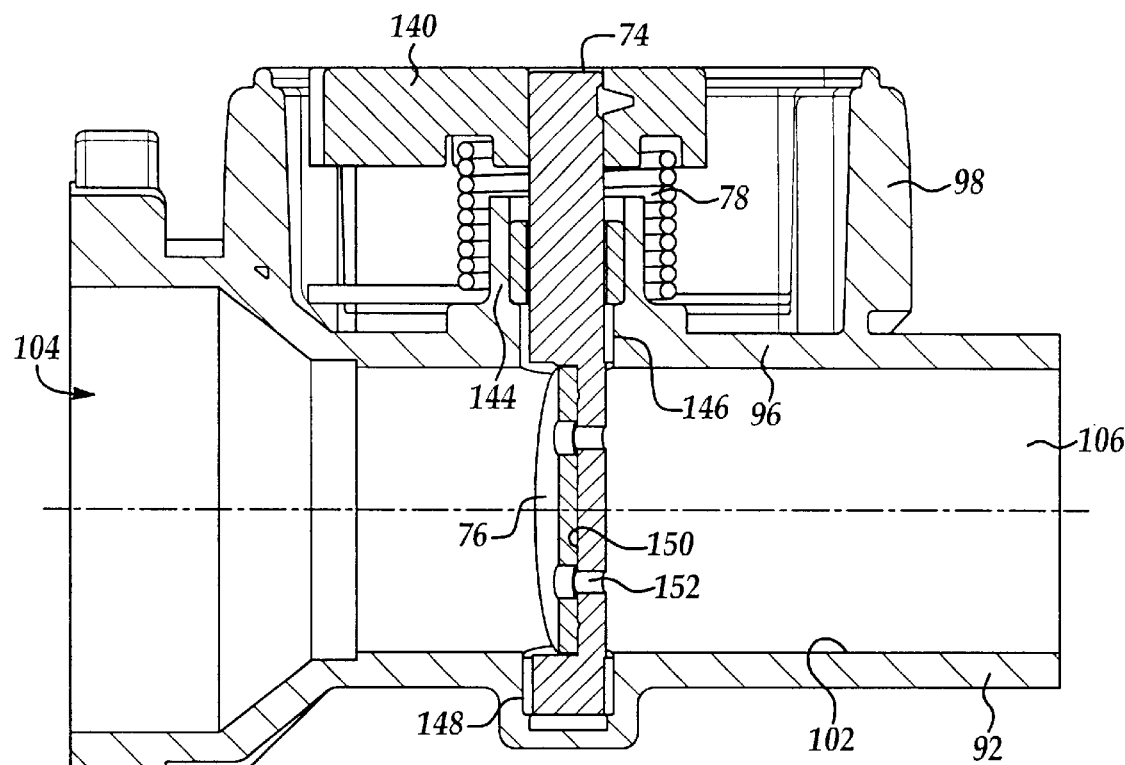
FIG. 4 is a cross-sectional view of the valve assembly of FIG. 2 taken along lines 4—4.

Referring now to FIGS. 2–4, a valve assembly 20 in accordance with one embodiment of the present invention will be described. Assembly 20 is provided to control the amount of coolant existing engine 12. Assembly 20 may include a valve housing 66, a motor 68, a circuit board 70 bearing a control circuit for motor 68, a gear assembly 72, a valve shaft 74, a valve plate 76, a return spring 78 and means, such as magnetic element 80 and sensor 82, for determining the position of valve shaft 74 and valve plate 76.

Valve housing 66 provides structural support for the other components of assembly 20. Housing 66 also protects the components of assembly 20 from foreign objects or elements and protects vehicle components in the event of a failure within assembly 20. Referring to FIG. 2, housing 66 may include a valve body 84 and a valve cover 86.

Valve body 84 may be divided into several portions 88, 90, 92 that may be integral with another. Portion 88 of valve body 84 is configured to house motor 68. Portion 88 is generally cylindrical in shape and is open at one end. Diametrically opposed baffles 94 (only one of which is shown in FIG. 2) extend between portion 88 and portion 90 to provide additional structural support.

Portion 90 is configured to house circuit board 70 and gear assembly 72. Referring to FIG. 3, portion 90 includes a bottom wall 96 and a plurality of side walls 98 extending upwardly from bottom wall 96. It should be understood that the term "bottom" is used herein with reference to the orientation of FIGS. 2–3 and should not be understood as a limitation on the orientation of assembly 20. A plurality of ears 100 are disposed about the periphery of portion 90 and extend outwardy from walls 98 for a purpose described hereinbelow.

Referring now to FIGS. 2–3, potion 92 defines a passage 102 in fluid communication with outlet 32 in engine block 22. Portion 92 may be generally cylindrical in shape, defining a fluid inlet 104 (best shown in FIG. 2) and outlet 106 (best shown in FIG. 3). A conventional hose (not shown may be coupled to portion 92 proximate outlet 106 to route coolant from passage 102 to pump 18. In the illustrated embodiment, the diameter of passage 102 is larger proximate inlet 104. This variation in diameter results from a difference between the size of the engine block coolant outlet 32 and the desired fluid flow characteristics of the valve assembly 20 in a particular application of assembly 20. Accordingly, it should be understood that the diameter of passage 102 may be uniform or varied without departing from the spirit of the present invention. Portion 102 may also define bores 108, 110 disposed on diametrically opposite sides of passage 102 and extending parallel to passage 102. Bores 108, 110 are configured to receive fasteners (not shown) such as screws, bolts, or pins that extend through bores 108, 110 and into engine 12. Although fasteners are used to couple valve assembly 20 to engine 12 in the illustrated embodiment, it should be understood that valve assembly 20 may be coupled to engine 12 in other conventional manners (e.g., welding).

Referring to FIG. 2, valve cover 86 provides access to other components of assembly 20. Cover 86 includes a plurality of ears 112 that align with ears 100 on portion 90 of valve body 84. Spring clips 114 may be used to secure valve cover 86 to body 84 with each clip 114 having one end extending into the apertures defined by ears 110 on portion 90 of valve body 84 and a second end engaging an outer surface of valve cover 86. Valve cover 86 further defines an electrical connector 116 in the form of a socket. Connector 116 enables the transmission of electrical signals between circuit board 70 and external devices. In particular, connector 116 enables circuit board 70 to receive a signal indicative of the temperature of engine 12 for use in controlling valve assembly 20. The signal may be received directly from an engine coolant temperature sensor (not shown) or from other sources conventional in the art.

Referring again to FIG. 3, motor 68 is provided to limit coolant flow through passage 102 and selectively close passage 102 by causing valve shaft 74 and plate 76 to rotate in a first rotational direction. Motor 68 is conventional in the art and may comprise a direct current brush motor. Motor 68 includes a motor shaft 118 extending outwardly therefrom disposed about a rotational axis 120.

Circuit board 70 includes a control circuit for use in controlling motor 68. Circuit board 70 is disposed within valve housing 66 and may be supported in portion 90 of valve body 84 using conventional structural supports (e.g., posts and ledges). Circuit board 70 includes a plurality of terminal fingers 122, 124 extending therefrom for connection to motor 68 and connector 116, respectively. Construction of the control circuit on board 70 is considered to be within the skill of those of ordinary skill in the art and will not be described in detail. The circuit is designed to selectively provide current to motor 68 responsive to the temperature of engine 12 so as to control the position of valve plate 76 within passage 102.

Gear assembly 72 is provided to transmit torque from motor shaft 118 to valve shaft 74. It will be understood by those in the art that torque may be transmitted between shafts 118, 74 using structures other than gears and that the particular gear assembly 72 illustrated is exemplary only. Assembly 72 includes a gear 126 disposed about motor shaft 118 and coupled thereto for rotation with motor shaft 118. Gear 126 meshes with another gear 128 disposed on a shaft 130 thereby causing rotation of gear 128 and shaft 130 along with another gear 132 disposed on shaft 130 below gear 128. Gear 132 meshes with gear 134 disposed on a shaft 136 thereby causing rotation of gear 134 and shaft 136 along with another gear 138 disposed on shaft 136 above gear 134. Gear 138 meshes with a sector gear 140 which is mounted to valve shaft 74 for rotation therewith. The teeth of sector gear 140 occupy an angular span of less than ninety (90) degrees.

Valve shaft 74 is provided to support plate 76. Valve shaft 74 may be disposed about a rotational axis 142 that extends parallel to the rotational axis 120 of motor shaft 118. A first axial end of valve shaft 74 is disposed within portion 90 of valve body 84 and extends through an opening in sector gear 140. Referring now to FIG. 4, shaft 74 extends through a boss 144 extending upwardly from wall 96 of portion 90 and extends diametrically through passage 102 such that a second axial end of valve 74 is located in an opposing wall of portion 92. Shaft 74 may be supported for rotation within the portions 90, 92 of valve body 84 by bushings 146, 148. Shaft 74 defines a notch 150 configured to receive valve plate 76.

Figure 5:
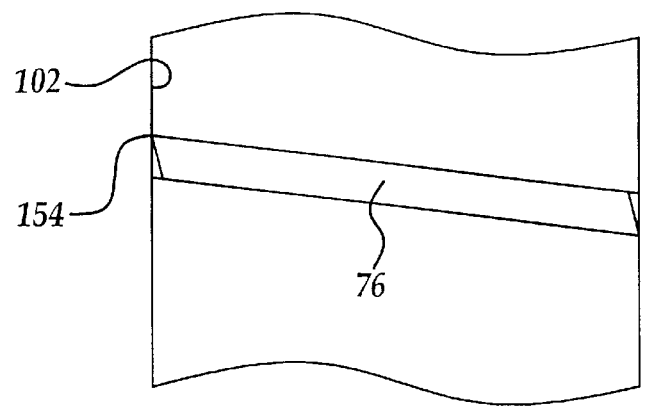
FIG. 5 is a top plan view of a portion of the valve assembly of FIG. 2.

Valve plate 76 is provided to open and close passage 102 to control the amount of coolant exiting engine 12. Plate 76 comprises a butterfly valve plate that is generally circular in shape and may be made from stainless steel. Plate 76 is received within notch 150 of shaft 74 and may be coupled thereto in a conventional manner using one or more fasteners 152 such as screws, bolts, or pins. When passage 102 is fully open, plate 76 is parallel to the direction of fluid flow within passage 102 to allow a maximum amount of coolant to flow through passage 102. Referring to FIG. 5, however, plate 76 has a beveled edge 154 such that, when passage 102 is fully closed, plate 76 is not perpendicular to the direction of fluid flow within passage 102. Therefore, plate 76 rotates hack and forth along an angular span of less than ninety (90) degrees. In one constructed embodiment of the invention, plate 76 rotates along an angular span of about eighty-five (85) degrees.

Referring again to FIG. 4, return spring 78 is provided to bias valve shaft 74 and plate 76 to a first rotational position. In the illustrated embodiment, spring 78 biases shaft 74 and plate 76 to a first extreme rotational position wherein passage 102 is open while motor 68 is used to drive shaft 74 and slate 76 to an opposite extreme rotational position wherein passage 102 is closed. It should be understood, however, that the roles of motor 68 and spring 78 could be reversed. It should also be understood that motor 68 could be used to drive shaft 74 and plate 76 to any of a plurality of rotational positions between the two extreme rotational positions. Spring 78 is conventional in the art. Spring 78 may be supported on boss 144 within portion 90 of valve body 84 with a first end of spring 78 coupled to a notch (not shown) in valve body 84 and a second end of spring 78 received within a notch in sector gear 140.

Referring again to FIG. 3, magnetic element 80 and sensor 82 are provided for use in determining the rotational position of valve shaft 74 and valve plate 76. Element 80 may be disposed about valve shaft 74 while sensor 82 may be spaced from element 80 on circuit board 70. In the illustrated embodiment, element 80 has a dog-bone shape and is received and held in place by sector gear 140. Element 80 defines diametrically opposite north and south poles. Sensor 82 is conventional in the art and may comprise a Hall effect sensor. Sensor 82 provides a feedback signal to the control circuit on circuit board 70 indicative of the rotational position of valve shaft 74 and valve plate 76.

A valve assembly 20 in accordance with the present invention has several advantages as compared to conventional devices for controlling the amount of coolant exiting an engine. The physical geometry of the butterfly valve plate 76 of the present invention is not significantly effected by variations in engine coolant temperature. As a result, the inventive valve assembly 20 allows little if any coolant to pass prior to the temperature at which the valve assembly 20 is designed to open. Engine efficiency is therefore increased resulting in greater fuel economy and reduced engine emissions. Second, the butterfly valve plate 76 of the present invention tolerates contamination from engine coolant better than conventional devices and therefore has a greater lifespan and requires less maintenance than conventional devices. Third, the inventive assembly 20 integrates the elements of the valve (e.g., the valve shaft 74 and plate 76) and the elements of the valve actuator (e.g., the motor 68) in a single assembly directly coupled to the engine 12. In this manner, the inventive assembly improves packaging, requires less material, reduces potential coolant leak points and improves bearing alignment for the valve shaft 74.

While the invention has been shown and described with reference to one or more particular embodiments thereof, it will be understood by those of skill in the art that various changes and modifications can be made without departing from the spirit and scope of the invention.

We claim:

1. A valve assembly for controlling an amount of coolant exiting an engine, comprising:

a valve housing mounted to said engine and having a passage extending therethrough, said passage in fluid communication with a coolant outlet in said engine;

a motor disposed within said housing and having a motor shaft extending therefrom;

a valve shaft configured to rotate responsive to rotation of said motor shaft; and, a plate rotatably supported on said valve shaft within said passage wherein a rotational position of said plate controls said amount of coolant exiting said engine.

2. The valve assembly of claim 1, further comprising a sector gear disposed about said valve shaft, said sector gear drivingly coupled to said motor shaft.

3. The valve assembly of claim 1, further comprising:

a magnetic element disposed about said valve shaft; and, a sensor spaced from said magnetic element, said sensor generating a signal indicative of said rotational position of said plate.

4. The valve assembly of claim 1, further comprising a circuit board disposed within said valve housing, said circuit board including a circuit for controlling said motor wherein said valve housing includes a valve cover defining a connector through which a signal indicative of a temperature of said engine is provided to said circuit.

5. The valve assembly of claim 1 wherein said valve housing includes first and second bores disposed on diametrically opposite sides of said passage, said first and second bores configured to receive fasteners extending through said bores and into said engine.

6. The valve assembly of claim 1 wherein said motor shaft and said valve shaft are disposed about parallel axes.

7. The valve assembly of claim 1 wherein said plate has a beveled edge.

8. A valve assembly for controlling an amount of coolant exiting an engine, comprising:

a valve housing mounted to said engine and having a passage extending therethrough, said passage in fluid communication with a coolant outlet in said engine;

a motor disposed within said housing and having a motor shaft extending therefrom;

a valve shaft configured to rotate responsive to rotation of said motor shaft; and, a plate rotatably supported on said valve shaft within said passage wherein a rotational position of said plate controls said amount of coolant exiting said engine and said rotational position is determined responsive to a temperature of said engine.

9. The valve assembly of claim 8, further comprising a sector gear disposed about said valve shaft, said sector gear drivingly coupled to said motor shaft.

10. The valve assembly of claim 8, further comprising:

a magnetic element disposed about said valve shaft; and, a sensor spaced from said magnetic element, said sensor generating a signal indicative of said rotational position of said plate.

11. The valve assembly of claim 8, further comprising a circuit board disposed within said valve housing, said circuit board including a circuit for controlling said motor wherein said valve housing includes a valve cover defining a connector through which a signal indicative of said temperature of said engine is provided to said circuit.

12. The valve assembly of claim 8 wherein said valve housing includes first and second bores disposed on diametrically opposite sides of said passage, said first and second bores configured to receive fasteners extending through said boors and into said engine.

13. The valve assembly of claim 8 wherein said motor shaft and said valve shaft are disposed about parallel axes.

14. The valve assembly of claim 8 wherein said plate has a beveled edge.

15. A valve assembly for controlling an amount of coolant exiting an engine, comprising:

a valve housing mounted to said engine and having a passage extending therethrough, said passage in fluid communication with a coolant outlet in said engine;

a motor disposed within said housing and having a motor shaft extending therefrom;

a valve shaft configured ton rotate responsive to rotation of said motor shaft; and, a plate rotatably supported on said valve shaft within said passage wherein a rotational position of said plate controls said amount of coolant exiting said engine and said plate rotates through an angular span of less than ninety degrees.

16. The valve assembly of claim 15, further comprising a sector gear disposed about said valve shaft, said sector gear drivingly coupled to said motor shaft.

17. The valve assembly of claim 15, further comprising:

a magnetic element disposed about said valve shaft; and, a sensor spaced from said magnetic element, said sensor generating a signal indicative of said rotational position of said plate.

18. The valve assembly of claim 15, further comprising a circuit board disposed within said valve housing, said circuit board including a circuit for controlling said motor wherein said valve housing includes a valve cover defining a connector through which a signal indicative of a temperature of said engine is provided to said circuit.

19. The valve assembly of claim 15 wherein said valve housing includes first and second bores disposed on diametrically opposite sides of said passage, said first and second bores configured to receive fasteners extending through said bores and into said engine.

20. The valve assembly of claim 15 wherein said slate has a beveled edge.

* * * * *